July 20, 1954
J. P. BUTTERFIELD
2,684,131
CAM ACTUATED MULTIPLE SHOE BRAKE
Filed Dec. 8, 1950
4 Sheets-Sheet 1
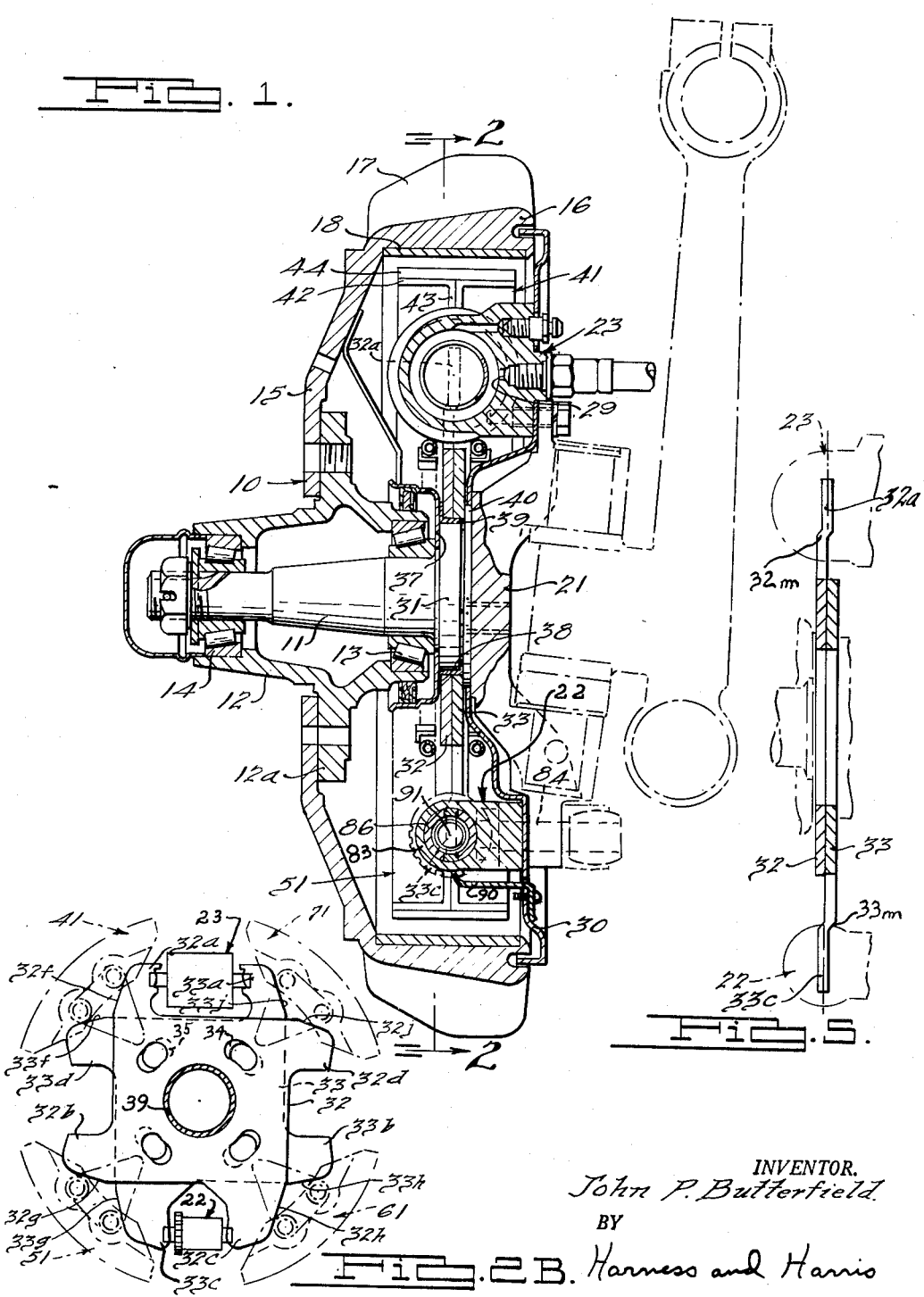
INVENTOR.
John P. Butterfield
BY
Harness and Harris
ATTORNEYS

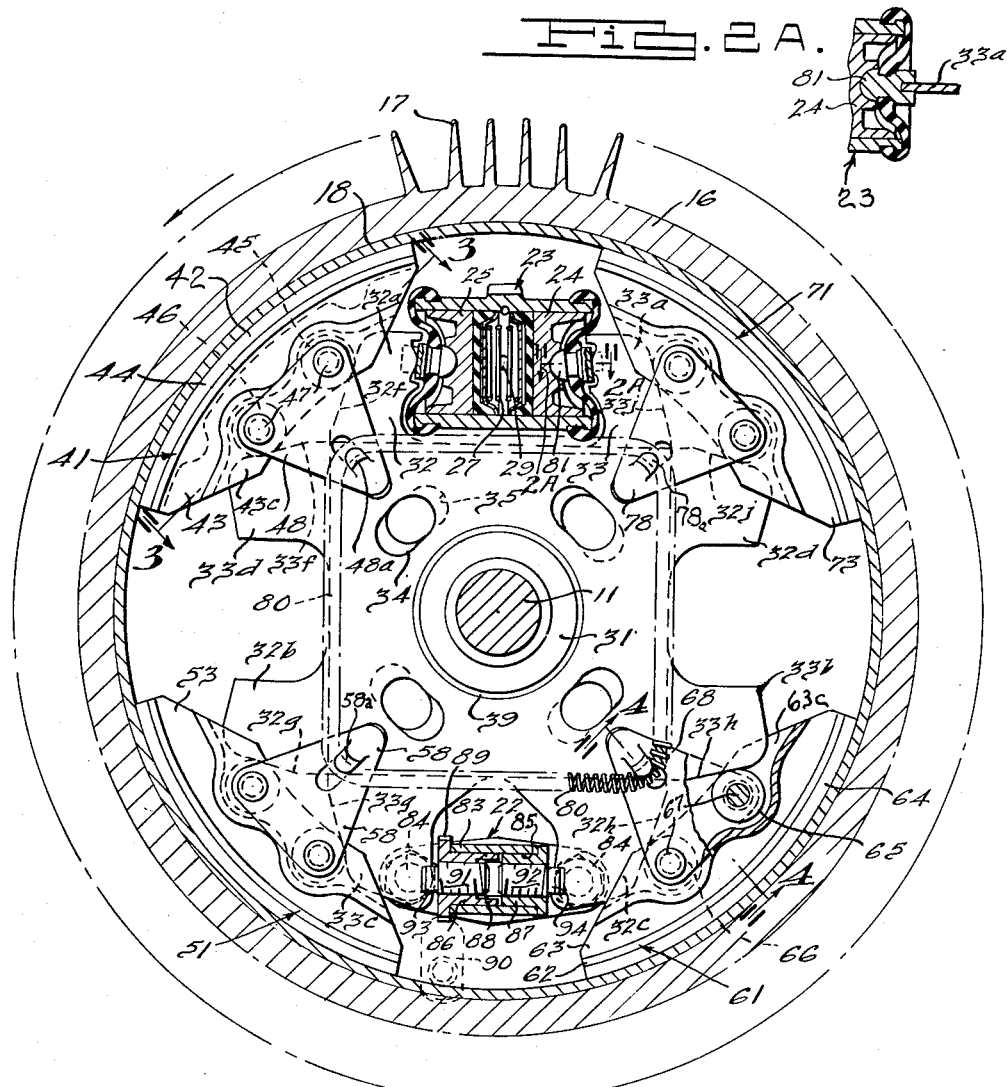

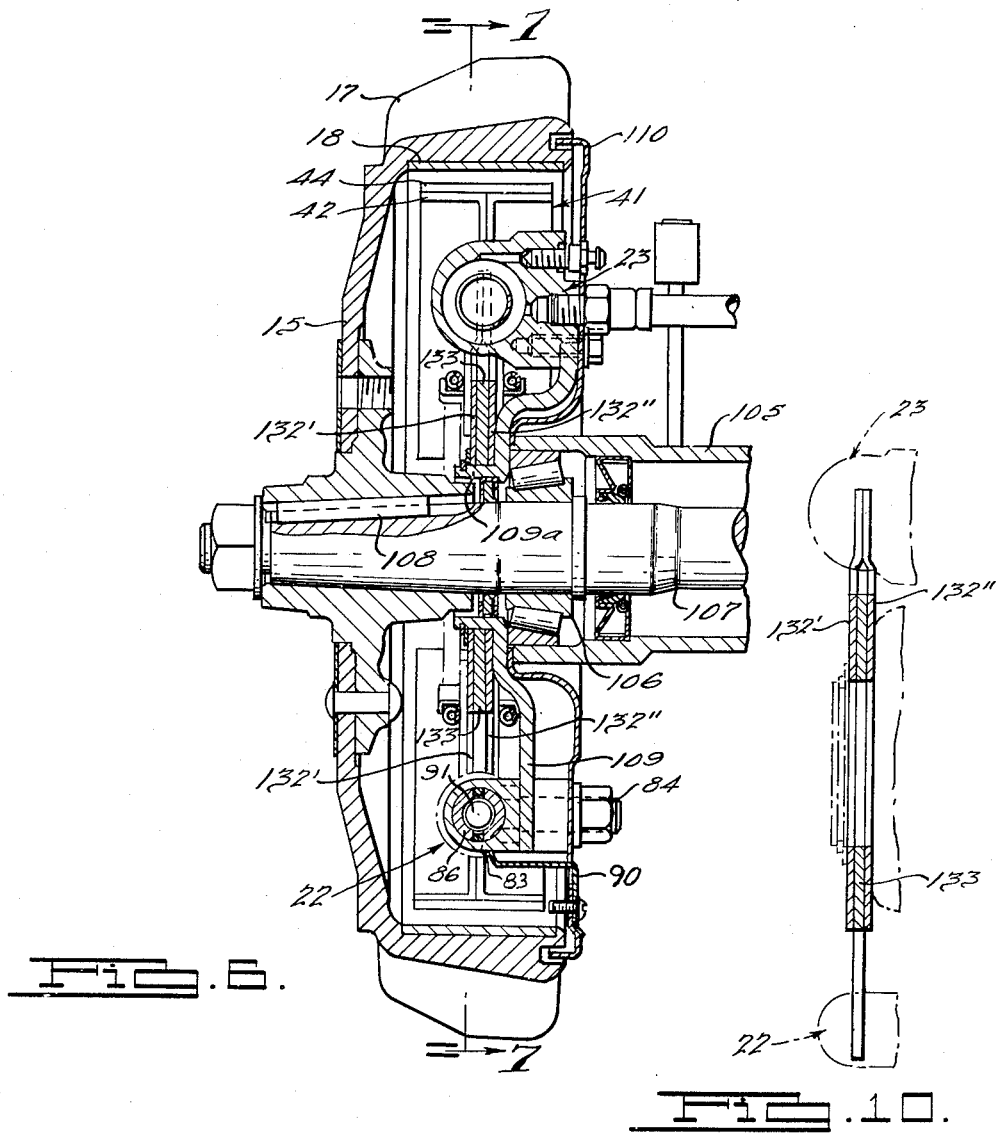

July 20, 1954  J. P. BUTTERFIELD  2,684,131
CAM ACTUATED MULTIPLE SHOE BRAKE
Filed Dec. 8, 1950  4 Sheets-Sheet 4
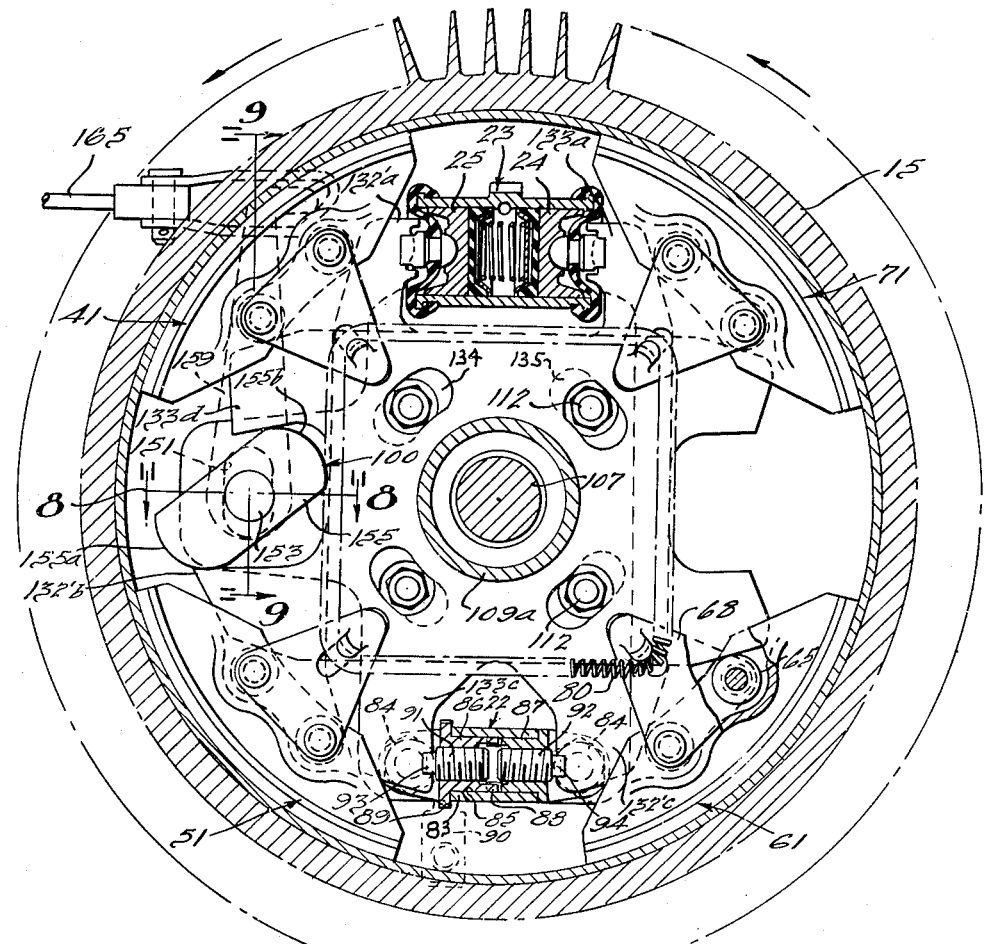
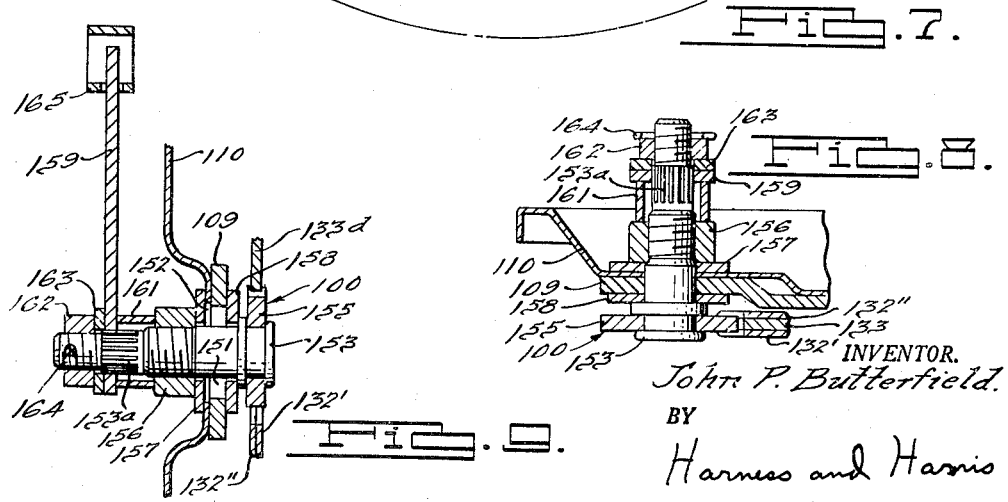
INVENTOR.
John P. Butterfield.
BY
Harness and Harris
ATTORNEYS.

Patented July 20, 1954

2,684,131

UNITED STATES PATENT OFFICE 2,684,131

CAM ACTUATED MULTIPLE SHOE BRAKE

John P. Butterfield, Grosse Pointe Woods, Mich., assignor to Chrysler Corporation, Highland Park, Mich., a corporation of Delaware Application December 8, 1950, Serial No. 199,889

7 Claims. (Cl. 188—78)

This invention relates to a cam actuated, multiple shoe brake that is self-actuating in both forward and reverse directions of brake drum rotation.

It is a primary object of this invention to provide an improved, simplified type of multiple shoe, internally expanding, brake assembly that has increased braking effectiveness, that is readily interchangeable between the front and the rear wheels as well as between the left and the right wheels of a motor vehicle or the like, and that is self-actuating in both directions of brake drum rotation.

It is a further object of this invention to provide an improved, simplified form of internally expanding, multiple shoe, brake that utilizes a pair of relatively rotatable cam plates to simultaneously actuate a plurality of brake shoe elements, each of which elements include follower means in balanced, controlled, rolling contact with the shoe actuating cam plates.

It is another object of this invention to arrange the brake shoes and the actuating means therefor such that the maximum amount of brake shoe lining area is utilized during braking operations with the result that the average unit braking pressures on the shoe linings are accordingly reduced. This reduction in unit lining braking pressures, resulting from increasing the effective brake shoe lining area, not only reduces lining wear but also prevents the development of hot spots along the brake shoes during braking action which hot spots produce erratic braking action. As a result of lowering the temperatures of the linings during braking, brake linings with a higher coefficient of friction may be used without the danger of the brakes becoming erratic or developing self-locking tendencies.

It is another object of this invention to provide a multiple shoe, internally expanding, brake with a combination brake shoe anchor bolt and shoe clearance adjusting device that permits the brake to be self-actuating in both directions of brake drum rotation. Furthermore, this single shoe anchor bolt assembly provides a single means for simultaneously adjusting each of the several brake shoes.

It is another object of this invention to provide a multiple shoe, self-actuating, internally expanding, brake that is symmetrically arranged and balanced in such a manner that the brake reaction forces applied thereto do not produce bending or torsional loads in the brake assembly.

It is still another object of this invention to provide a multiple shoe, internally expanding, brake having brake shoe actuating means that moves the shoes radially outward into engagement with the surrounding brake drum in such a manner that the entire surface area of the several shoe linings is effective during braking action. This provides the most effective braking action with the minimum wear and the minimum amount of heat application to the shoe linings.

It is a still further object of this invention to provide a novel brake shoe aligning and brake shoe return or retracting mechanism.

It is a still further object of this invention to provide a mechanically operable parking or emergency brake that operates the hydraulically operable cam plate shoe actuating means.

Other objects and advantages of this invention will become apparent from a reading of the attached specification and a consideration of the related drawings wherein:

Fig. 1 is a sectional elevational view of a front wheel steering knuckle and support mounting a wheel brake assembly embodying one form of this invention;

Fig. 2 is a sectional elevational view taken along the line 2—2 of Fig. 1 with certain portions of the assembly broken away for the sake of clarity;

Fig. 2A is a fragmentary sectional elevational view taken along line 2A—2A of Fig. 2;

Fig. 2B is a schematic view of the brake shoe actuating mechanism;

Fig. 3 is a fragmentary sectional elevational view taken along the line 3—3 of Fig. 2 showing the brake shoe follower arrangement;

Fig. 4 is a fragmentary sectional elevational view taken along the line 4—4 of Fig. 2 showing the brake shoe positioning means;

Fig. 5 is a fragmentary sectional elevational view of the pair of offset cam plates disclosed in Figs. 1 and 2;

Fig. 6 is a sectional elevational view of a rear wheel axle and housing mounting a wheel brake assembly embodying a modified form of this invention;

Fig. 7 is a sectional elevational view taken along the line 7—7 of Fig. 6;

Fig. 8 is a fragmentary sectional elevational view taken along the line 8—8 of Fig. 7 showing the manually operable means for actuating the brake shoes so as to provide a parking or emergency brake within the wheel brake assembly;

Fig. 9 is a fragmentary sectional elevational view of the parking brake actuating mechanism, the view being taken along the line 9—9 of Fig. 7; and Fig. 10 is a sectional elevational view of the sandwich type cam plates disclosed in Figs. 6 and 7.

Figs. 1 and 2 of the drawings show one form of this invention applied to the wheel brake assembly 10 that is mounted on the front wheel steering knuckle 11 of a conventional motor vehicle wheel suspension. The steering knuckle 11 has the wheel hub 12 rotatably mounted thereon by the bearings 13 and 14. Wheel hub 12 has a radially extending flange 12a to which is bolted or pinned the rotatable wheel brake drum 15. Brake drum 15 has an axially extending, peripheral, flange 16 that is provided with exteriorly disposed heat dissipating fins 17 and an interiorly disposed wear resistant, brake shoe engageable liner 18. The steering knuckle 11, at the inner end thereof, is formed with an integral, radially extending, brake supporting portion or plate 21. Support portion 21 has the combination brake shoe anchor bolt and clearance adjusting mechanism 22 fixedly mounted thereon adjacent the lower side of the drum 15. The mechanism 22 is subsequently described in detail. At the upperside of the brake drum 15 the support portion 21 has a more or less conventional hydraulic, double piston type, brake shoe actuating wheel cylinder 23 fixedly mounted thereon. The wheel cylinder 23 includes the pair of opposed, reciprocable, pistons 24 and 25 between the heads of which is mounted the compression spring 27. Pressure fluid to urge the pistons 24 and 25 apart is introduced to the bore in wheel cylinder 23 through the port 29. Port 29 is adapted to be connected to the master cylinder of a conventional wheel brake hydraulic actuating system. A dust cover 30 is mounted on the steering knuckle 11 at the inner side thereof so as to extend across and enclose the open side of the wheel brake drum 15.

The steering knuckle 11 has an enlarged annular, flange or collar-like formation 31 adjacent the inner side thereof that is adapted to receive and rotatably support the pair of brake shoe actuating cam plates 32 and 33. A journal bearing sleeve 39 may be mounted between the steering knuckle collar 31 and the bores in the plates 32, 33 to facilitate rotation of the plates 32, 33 on the collar 31. Fig. 2B schematically shows the arrangement of the plates and their actuating mechanism. Plates 32 and 33 are provided with sets of aligned openings 34 and 35 respectively to provide a means for receiving bolts used to connect a rear wheel brake assembly to a supporting structure such as a rear wheel axle carrier (see Fig. 6). However, in the front wheel steering knuckle supported brake assembly disclosed in Figs. 1 and 2, the openings 34, 35 are not used. In the front wheel assembly the plates 32 and 33 are maintained in face-to-face engagement on the steering knuckle collar 31 by means of the bearing assembly 13 that holds the seal plate 37 against a washer 38 that bears against the outer side of the plate 32. The steering knuckle shoulder 40 bears against the inner side of the cam plate 32 to support the plate 32 in a vertical position. Thus it will be seen that the cam plates 32, 33 may rotate on the steering knuckle collar 31 while being maintained in a radially or vertically disposed, face-to-face, engaged, position.

The cam plates 32, 33 each have a peripheral extension 32a, 33a respectively that is connected to one of the actuating pistons of the wheel cylinder 23. Extension 32a of cam plate 32 is connected to the piston 25 while extension 33a of cam plate 33 is connected to the piston 24. Admission of pressure fluid to the wheel cylinder 23 through port 29 will move the pistons 24, 25 apart and effect relative rotation in opposite directions between the cam plates 32, 33 that are freely journalled on the steering knuckle collar 31.

Each of the cam plates 32, 33 is substantially a flat square plate that has finger-like extensions projecting outwardly from each corner thereof. These finger-like extensions are designated 32a, 32b, 32c and 32d for plate 32 and 33a, 33b, 33c and 33d for plate 33. The adjacently positioned, cooperating pairs of projections on the two cam plates 32, 33 such as the projections 32a and 33d, 32b and 33c, 32c and 33b, and 32d and 33a are arranged such that they have side edges such as the side edges 32f, 33f, the edges 32g, 33g, the edges 32h, 33h and the edges 32j, 33j that cross in such a manner that they provide four substantially V-shaped or converging inwardly extending openings or cam tracks about the periphery of the cam plates 32, 33. The V-shaped openings hereinabove described constitute the actual cam plate tracks that are utilized for actuation of the brake shoe segments that are to be subsequently described. It is thought that it is obvious that separation of the wheel cylinder pistons 24, 25 will rotate the cam plates 32, 33 in opposite directions on their journal 31 and as a consequence the angle between the sides of the V-shaped openings 32f, 33f and 32g, 33g, etc., will be reduced. This variation in the angle between the opposite sides of the V-shaped cam plate openings is used to effect actuation of the associated brake shoe segments.

Mounted concentrically within the interiorly lined flange 16 of the brake drum 15 are a plurality of identically constructed, lined brake shoe segments 41, 51, 61 and 71 respectively. Each of these shoe segments comprises a flange portion such as the flange 42 and a web portion, such as the web 43, that extends normal to the central portion of the inner side of the flange 42. The outer side of flange 42 is covered with any suitable type of known brake lining 44. The flange and web portions of the brake shoes herein disclosed are preferably formed from pairs of L-shaped or angle sections that are suitably connected together by welding or the like to provide the substantially T-shaped brake shoe segments 41, 51, 61 and 71. The web portions of the shoe segments are separated along portions of their length to provide the spaced apart walls 43a and 43b (see Fig. 3), the spaced apart walls 63a and 63b (see Fig. 4) and the like. Mounted between the spaced apart shoe web walls 43a and 43b, and the like, are a pair of ring-like rollers 45 and 46. Rollers 45 and 46 are rotatably mounted on and connected to the web walls 43a and 43b by the rivets 47. Rivets 47 also connect a pair of substantially triangular shaped brake shoe positioning plates 48 to the outside surfaces of the shoe web walls 43a and 43b respectively. Positioning plates 48 are of spring steel or the like and extend radially inwardly from the shoe webs a sufficient distance to engage the outside surfaces of the cam plates 32 and 33. The plates 48, 58, 68 and 78 thus provide a means for maintaining the shoe webs 43, 53, 63 and 73 aligned with the cam plates 32, 33. It will also be noted that the spaced apart wall portions of the shoe webs such as the portions 43c and 63c (see Fig. 2) receive the finger-like cam plate projections 33d and 33b respectively and thus other means than the plates 48, 58, 68, and 78 are provided to maintain the shoe webs 43, 53, 63 and 73 aligned with the cam plates 32, 33.

Each of the positioning plates 48, 58, 68, 78 has a tab 48a, 58a, 68a or 78a lanced from it so as to project outwardly from the associated plate in a manner to receive an endless type of coiled tension spring 80. Due to the tension spring 80 encircling and connecting the tabs 48a, 58a, 68a and 78a of the shoe carried positioning plates 48, 58, 68 and 78 respectively, there is provided a brake shoe return spring mechanism of an improved and simplified form. As there are springs 80 on both sides of the plates 32, 33 it is obvious that there will be no tendency for the brake shoes to cock as a result of the action of the shoe return springs 80.

From the above description of the brake assembly shown in Figs. 1-5, it is thought that it is obvious that a simplified form of wheel brake assembly is provided that lends itself to quick, easy, installation in any more or less conventional wheel brake drum. The cam plates 32, 33 are merely arranged in face-to-face engagement and then the several shoe segments are mounted over the end edges of the cam plates 32, 33 so that the web rollers, such as rollers 45, 46 of the shoe 41, seat upon the cam plate edges such as the edges 32f, 33f of the cam plates 32, 33. The spring-like shoe positioning plates, such as the plates 48, will thus engage the outside surfaces of the cam plates 32, 33 to hold the cam plates and shoe elements is assembled relationship. Next the shoe return springs 80 are mounted on the shoe positioning plate tabs 48a, 58a, 68a and 78a so as to resiliently connect the shoes to the cam plates. This assembly of shoe elements and cam plates may be pre-assembled as a packaged unit and applied to the wheel assembly in an easy, quick, manner as the vehicle chassis moves along an assembly line.

It will be noted from Fig. 2 that the cam plate projections 32a and 33a are connected to the wheel cylinder pistons 24, 25 through a slotted, connection (see Fig. 2A) that includes a slotted, pivotally mounted, thrust link 81. This type of link connection is more or less conventional and forms no part of this invention. However, the cam plate, connections 32c, 33c to the combination cam plate anchor bolt and shoe clearance adjusting device 22, does include structure forming a part of this invention.

The combination cam plate anchor bolt and brake shoe clearance adjusting device 22 comprises a pedestal or pillow block 83 that is suitably bolted to the steering knuckle support 21 at 84. Pedestal 83 has a bore 85 therethrough in which is rotatably mounted a pair of flanged, internally threaded, sleeves 86 and 87. The internal threads in the sleeves 86 and 87 are of opposite hands for a reason that will subsequently be readily apparent. The adjacent ends of the sleeves 86 and 87 are provided with mating interengaged slots and teeth 88 that permit the two sleeves 86 and 87 to be rotated as a unit. The flanged end of sleeve 86 is provided with a toothed periphery 89 that is adapted to be engaged by a toothed finger 90 that anchors the sleeves 86 and 87 in adjusted position. The threaded internal bores in the sleeves 86 and 87 have threadably mounted therein the bolts 91 and 92 respectively. Bolts 91 and 92 have bifurcated outer ends 93 and 94 respectively that receive the edges of the cam plate extensions 33c and 32c respectively.

It is thought to be obvious that rotation of the connected sleeves 86, 87 through turning of the toothed flange 89 will simultaneously thread the bolts 91 and 92 either into or out of the sleeves 86 and 87 and thereby change the effective length of the bolts 91 and 92 so as to cause relative rotation of the cam plates 32, 33 in opposite directions. Accordingly the plates 32, 33 will move the brake shoes 41, 51, 61 and 71 either towards or away from the brake drum flange 16 and thus vary the normal clearance between the shoes and the drum flange 16.

Not only does the mechanism 22 provide a shoe clearance adjusting device, but in addition it provides an anchor device for the cam plates 32, 33 that permits the brake assembly 10 to be self-actuating in either direction of rotation of the brake drum 15. Considering Fig. 2, it will be apparent that if the brake drum 15 is rotating counterclockwise, that is, in the direction of the indicating arrows, then on application of the brakes the cam plate 33 will have projection 33c anchored against the bolt 91 of the anchor bolt assembly 22 and all the brake shoes are then self-actuating. If the brake drum 15 is rotating in the opposite or clockwise direction then the cam plate 32 has projection 32c anchored against the bolt 92 of the anchor bolt assembly 22 and again all the brake shoes will be self-actuating shoes.

As a result of the cam plate and roller type of brake shoe actuating construction herein disclosed, the several brake shoes each have substantially their entire lined flange areas moved radially outwardly into substantially normal engagement with the brake drum lined internal surface on application of the brakes. This utilizes the maximum amount of lining and reduces unit pressures and lining wear. Furthermore, by using a plurality of brake shoe segments, the lined flanges can more nearly fit the existing contour of the inner concave side of the brake drum flange 16 so that more braking surface is utilized with a consequent lower unit brake lining pressures and less wear. These reduced lining pressures tend to keep the linings at lower temperatures than would otherwise be the case and thus the several shoes prevent erratic brake action. Accordingly, the brake construction disclosed in Figs. 1-5 tends to increase effectiveness and brake life at practically no cost penalty.

Another advantageous feature of the brake construction shown in Figs. 1-5 is clearly disclosed in Fig. 5. The pair of cam plates 32, 33 are arranged so that the braking and reaction forces developed during braking action will lie in the plane that extends mid-way between the engaged faces of the cam plates 32, 33. Such plane is thus centrally disposed with respect to both the shoe actuating wheel cylinder 23 and the anchor bolt assembly 22. This arrangement is accomplished by offsetting or joggling the portions 32m and 33m of the cam plates adjacent their connection to the wheel cylinder 23 and the anchor bolt assembly 22. By the offset or joggled cam plate construction the cost of the brake assembly is reduced and bending or torsional forces that might tend to cock the brake shoes are kept to a minimum and the effectiveness, reserve and alignment of the brake is improved.

Figs. 6-10 show a modified form of the invention wherein a sandwich type of cam plate construction 132', 132" and 133 is utilized in place of the joggled pair of cam plates 32 and 33 shown in Figs. 1-5. Figs. 6-10, which show the brake assembly mounted on the rear wheel assembly of a motor vehicle chassis, also includes the mechanically operable parking hand brake or emergency brake mechanism 100. This parking brake utilizes the same cam plate actuated brake shoe segments that are actuated by the hydraulic wheel cylinder 23. In all other respects the Figs. 6–10 form of the invention is identical to the Figs. 1–5 form of the invention and the same reference numerals have been assigned to identical elements in the two forms of the invention.

In Figs. 6–10 the axle housing 105 mounts a bearing assembly 106 that rotatably supports an axle shaft 107. Axle shaft 107 has the wheel brake drum 15 drivingly connected thereto by the key 108. Housing 105 has a brake support plate 109 and a brake drum dust cover 110 fixedly connected thereto. Support plate 109 has fixedly connected thereto the wheel cylinder 23 and the combination anchor bolt and brake shoe clearance adjusting assembly 22. The circular flange 109a on the support plate 109 supports the cam plates 132', 132" and 133 for limited relative rotation. Bolts 112 which extend through the elongated slots 134 and 135 in the cam plates 132', 132" and 133 respectively, connect the support plate 109 to the axle housing 105. Bolts 112 also limit the relative rotational movement of the cam plates. The portions 132'c, 132"c, 133 are connected to the anchor bolts 92 and 91 of assembly 22 in the same manner as disclosed with regard to plate portions 32c and 33c of the Figs. 1–5 form of the invention. The portions 132'a, 132"a and 133a at the upper sides of the cam plates are connected the pistons 25 and 24 respectively of the wheel cylinder assembly in a manner similar to that described with regard to the Figs. 1–5 form of the invention.

As clearly shown in Figs. 6–10, the cam plates for actuating the brake shoe segments 41, 51, 61, 71 comprise a pair of relatively thin plates 132' and 132" that are spaced apart over the majority of their area but connected together in face-to-face engagement along sections of their peripheral edge portions. The connected upper edge portions 132'a, 132"a of plates 132', 132" respectively are attached to the central portion of piston 25 of the wheel cylinder 23. Mounted between the spaced apart plates 132' and 132" is a relatively thick, perfectly flat, cam plate 133 that has its upper portion 133c connected to the central portion of the wheel cylinder piston 24. As a result of this balanced arrangement of the thrust transmitting members of the brake assembly shown in Figs. 6–10, there is little possibility of torsional loads being applied to the brake shoes during actuation of the shoes by the wheel cylinder 23. Thus the brake shoes will have no tendency to cock and braking effectiveness and reserve will be improved.

It will be noted that the Figs. 6–10 arrangement has the relatively thick, flat cam plate 133 arranged so that it takes the forward brake reaction. This rigid, flat plate will have no tendency to tilt or cock and thus on forward drive reaction is always in a plane that is aligned with and bisects the wheel cylinder 23 and the anchor bolt assembly 22. The two relatively thin cam plates 132', 132" are more than sufficient to take the braking reaction during reverse drive braking.

Figs. 6–10 also show a form of mechanically operated parking and/or emergency brake that utilizes the cam plate actuated brake shoes 41, 51, 61, 71 for a second type of braking. Instead of actuating the cam plates 132', 132" and 133 by the wheel cylinder 23, the parking brake assembly 100 is adapted to actuate the cam plates by a cam 155. The brake support plate 109 and the dust cover 110 have aligned, elongated, slots 151 and 152 therein. Rotatably mounted in the slots 151 and 152 is the bolt 153. Bolt 153 has a cam element 155 pressed or otherwise nonrotatably fixed thereon. Bolt 153 is held in position in the slots 151 and 152 by means of the nut 156 and the washers 157 and 158. Nut 156 is turned up against washer 157 so as to press washer 158 against support plate 109 with sufficient force to permit bolt 153 to be rotated but to prevent its rattling, tilting, or the like. A portion 153a of the bolt 153 has splines that drivingly receive a lever 159 that is used to rotate the bolt 153 and its cam member 155. A spacer 161 extends between lever 159 and the nut 156. A nut 162 is arranged to bear against a washer 163 that engages the lever 159 to hold the lever 159 on the bolt 153. A cotter-pin 164 may be used to lock the nut 162 on the bolt 153. A linkage 165 may be used to actuate the lever 159 and its cam element 155.

It will be noted that opposite edge portions 155a, 155b of the cam member 155 engage the edges of portions 132'b, 132"b of cam plates 132', 132" and the edges of the portion 133d of the cam plate 133 to provide for actuation of the cam plates in opposite directions of relative rotation. Obviously the relative rotation of the cam plates 132', 132" and 133 by the cam 155 will actuate the brake shoes 41, 51, 61 and 71 and produce a wheel braking effect.

The Figs. 6–10 form of the invention thus provides all of the advantages obtainable with the Figs. 1–5 form of the invention but utilizes a three-plate, symmetrically arranged, cam plate shoe actuating mechanism in place of the two-plate shoe actuating mechanism shown in Figs. 1–5.

I claim:

1. A brake mechanism comprising a support, a brake drum rotatably mounted on said support, a pair of radially extending cam plates rotatably mounted on said support and arranged for relative rotation with respect to each other, said cam plates having cooperating formations along the edges thereof arranged to provide substantially V-shaped cam tracks of variable cam configuration upon relative rotation between said plates, and a plurality of internally expandible, arcuate brake shoes concentrically mounted within said drum having portions thereon adapted to be moved radially outward for frictional engagement with said drum, said shoes each having roller follower means mounted thereon intermediate the ends of said shoes and positioned to be continuously engageable with said cam plate tracks to floatingly support said shoes on the cam plate tracks whereby relative rotation between said plates in one direction is effective to cause the cam plate tracks to actuate the followers on the brake shoes and move said brake shoes radially outward into engagement with said drum, anchor means mounted on said support and connected to said cam plates to effect relative rotation between said plates in said one direction, anchor means mounted on said support and engageable with each of said plates to provide an anchor for resisting rotation of each of said plates in either direction of plate rotation, said anchor means being arranged such that certain of said brake shoes are self actuated on rotation of the brake drum in either a forward or a reverse direction, radially extending fingers on each of said shoes embracing said plates and guiding movement of said shoes during actuation thereof, and resilient means to retract said brake shoes radially inwardly, said resilient means comprising a continuous resilient element interconnecting the radially extending fingers on the several brake shoes and normally urging said brake shoes radially inwardly.

2. A brake mechanism comprising a support, a brake drum rotatably mounted on said support, a pair of radially extending cam plates rotatably mounted on said support and arranged for relative rotation with respect to each other, said cam plates having cooperating formations along the edges thereof arranged to provide substantially V-shaped cam tracks of variable cam configuration upon relative rotation between said plates, and a plurality of internally expandible, arcuate brake shoes concentrically mounted within said drum having portions thereon adapted to be moved radially outward for frictional engagement with said drum, said shoes each having roller follower means mounted thereon at positions centrally of the length of said shoes and positioned to be continuously engageable with said cam plate tracks to floatingly support the shoes on the cam plate tracks whereby relative rotation of said plates in one direction is effective to cause the cam plate tracks to actuate the followers on the brake shoes and move said brake shoes radially outward into engagement with said drum, means mounted on said support and connected to said cam plates to effect relative rotation between said plates in said one direction, means mounted on said support and engaged with each of said plates to provide an anchor for resisting rotation of each of said plates in either direction of plate rotation, said anchor means being arranged such that certain of said brake shoes are self actuating on rotation of the brake drum in either a forward or a reverse direction, and resilient means to retract said brake shoes radially inwardly, said shoes each including radially extending shoe guiding fingers that extend against and clampingly engage the side surfaces of the cam plates to guide the movement of said brake shoes with respect to the cam plates.

3. A brake mechanism comprising a support, a brake drum rotatably mounted on said support, a pair of radially extending cam plates rotatably mounted on said support and arranged for relative rotation with respect to each other, said cam plates having cooperating formations thereon arranged to provide a plurality of circumferentially spaced, similar cam tracks of variable cam configuration upon relative rotation between said plates, and a plurality of internally expandible, arcuate brake shoes concentrically mounted within said drum having lined portions thereon adapted to be moved radially outward for frictional engagement with said drum, said shoes each having radially extending follower means pivotally mounted thereon centrally of the length of said shoes and continuously engageable with said cam plate tracks to floatingly support each of said shoes on a cam track whereby relative rotation of said plates in one direction is effective to move said brake shoes radially outward into engagement with said drum, actuating means connected to said plates to effect relative rotation between said plates in said one direction, and anchor means mounted on said support and engageable with each of said plates to provide an anchor for resisting rotation of each of said plates in either direction of plate rotation whereby said shoes are self-actuating in either direction of drum rotation, said shoes each mounting radially extending resilient elements that engage the cam plates and guide the movement of the shoes relative to the cam plates and resilient means interconnecting the several resilient shoe guiding elements to continuously urge said shoes radially inwardly.

4. A brake mechanism comprising a support, a brake drum rotatably mounted on said support, a pair of radially extending cam plates rotatably mounted on said support and arranged for relative rotation with respect to each other, said cam plates having cooperating formations thereon arranged to provide a plurality of circumferentially spaced, congruent cam tracks of variable cam configuration upon relative rotation between said plates, and a plurality of internally expandible brake shoes concentrically mounted within said drum having portions thereon adapted to be moved radially outward for frictional engagement with said drum, said shoes each having roller follower means mounted thereon at positions centrally of the length of said shoes continuously engageable with said cam plate tracks to floatingly support each of said shoes on one of said cam tracks whereby relative rotation of said cam plates in one direction is effective to move said brake shoes radially outward into engagement with said drum, actuating means mounted on said support and connected to said cam plates to effect relative rotation between said plates in said one direction, and means mounted on said support and engageable with each of said plates to provide an anchor for resisting rotation of each of said plates in either direction of plate rotation, whereby said shoes are self actuating in either direction of plate rotation, said cam plates comprising similar flat plates in face-to-face engagement with the plane of the engaging plate faces located centrally with respect to the actuating means and the anchor means for the plates, each of said cam plates having an offset edge portion connected to the central portion of the actuating means and the central portion of the anchor means and each of said shoes having radially extending fingers embracing said plates to provide for guided movement of the shoes during expansion and retraction thereof.

5. A brake mechanism comprising a support, a brake drum rotatably mounted on said support, a pair of radially extending cam plates rotatably mounted on said support and arranged for relative rotation with respect to each other, said cam plates having cooperating formations thereon arranged to provide cam tracks of variable cam configuration upon relative rotation between said plates, and a plurality of internally expandible brake shoes concentrically mounted within said drum having portions thereon adapted to be moved radially outward for frictional engagement with said drum, said shoes each having follower means mounted thereon continuously engageable with said cam plate tracks whereby relative rotation of said cam plates in one direction is effective to move said brake shoes radially outward into engagement with said drum, actuating means on said support connected to said cam plates to effect relative rotation between said plates in said one direction, and means mounted on said support and engaged with each of said plates to provide an anchor for resisting rotation of each of said plates in the other direction of relative plate rotation, said cam plates comprising a first unitary, relatively thick, flat plate having edge portions thereof connected to the central portions of the plate actuating means and plate anchor means, and a second composite cam plate formed of a pair of relatively thin, spaced apart, flat plates that have offset edge portions engaged in face-to-face relationship and connected to centrally disposed portions of the plate actuating and anchor means, said spaced apart portions of the composite cam plate matingly receiving the relatively thick plate.

6. A brake mechanism comprising a support, a brake drum rotatably mounted on said support having an axially extending flange, a pair of radially extending cam plates rotatably mounted on said support positioned in face-to-face engagement and arranged for relative rotation with respect to each other, said cam plates having cooperating edge formations thereon adapted to provide cam tracks of variable cam configuration upon relative rotation between said plates, and a plurality of internally expandible brake shoes concentrically mounted within said drum having axially extending flange portions adapted to be moved radially outwardly into frictional engagement with said drum flange and radially inwardly extending web portions on said shoe flanges, said shoe web portions each having a pair of roller followers pivotally mounted thereon at positions centrally between the shoe ends and arranged to be continuously engageable with said cam plate tracks to floatingly support the brake shoes on the cam plate tracks whereby relative rotation of said plates in one direction is effective to move said brake shoes into engagement with said drum, resilient means interconnecting said shoes tending to cause relative rotation of said plates in the opposite direction to radially retract said shoes from said drum, a hydraulically operated thrust transmitting means mounted on said support and connected to each cam plate in a manner to effect relative rotation between said plates in said one direction, and anchor means mounted on said support and engageable with each of said plates to provide an anchor for resisting rotation of each of said plates in either direction of plate rotation whereby said shoes are self actuating in either direction of drum rotation.

7. A brake mechanism comprising a support, a brake drum rotatably mounted on said support, a pair of radially extending cam plates rotatably mounted on said support and arranged for relative rotation with respect to each other, said cam plates having cooperating formations along the edges thereof arranged to provide substantially V-shaped cam tracks of variable cam configuration upon relative rotation between said plates, and a plurality of internally expandible, arcuate brake shoes concentrically mounted within said drum having portions thereon adapted to be moved radially outward for frictional engagement with said drum, said shoes each having roller follower means mounted thereon at a position centrally between the ends of the shoes and positioned to be continuously engageable with said cam plate tracks so as to floatingly support each of said shoes in the associated cam plate track whereby relative rotation of said plates in one direction is effective to cause the cam plate tracks to actuate the followers on the brake shoes and move said brake shoes radially outward into engagement with said drum along the full length of said shoe, means on said support connected to said cam plates to effect relative rotation between said plates in said one direction, means mounted on said support and engaged with each of said plates to provide an anchor for resisting rotation of each of said plates in either direction of plate rotation, said anchor means being arranged such that all of said brake shoes are self actuating on rotation of the brake drum in either a forward or a reverse direction, and resilient means to retract said brake shoes radially inwardly, said resilient means comprising a continuous resilient element interconnecting the several brake shoes and normally urging said brake shoes radially inwardly.

References Cited in the file of this patent

UNITED STATES PATENTS

| Number | Name | Date |
|---|---|---|
| 1,946,928 | Brewer | Feb. 13, 1934 |
| 1,948,822 | Lindblom | Feb. 27, 1934 |
| 2,130,857 | Press | Sept. 20, 1938 |
| 2,211,439 | Schnell et al. | Aug. 13, 1940 |
| 2,406,754 | Forbes | Sept. 3, 1946 |
| 2,578,285 | Butterfield | Dec. 11, 1951 |

FOREIGN PATENTS

| Number | Country | Date |
|---|---|---|
| 539,923 | France | July 3, 1922 |
| 740,257 | France | Jan. 24, 1933 |